US010340562B2

(12) United States Patent
Kimura

(10) Patent No.: US 10,340,562 B2
(45) Date of Patent: Jul. 2, 2019

(54) BATTERY PACK AND HEATER ASSEMBLY

(71) Applicant: TOYOTA JIDOSHA KABUSHIKI KAISHA, Toyota-shi, Aichi-ken (JP)

(72) Inventor: Kenji Kimura, Miyoshi (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 522 days.

(21) Appl. No.: 15/077,314

(22) Filed: Mar. 22, 2016

(65) Prior Publication Data

US 2016/0285140 A1   Sep. 29, 2016

(30) Foreign Application Priority Data

Mar. 23, 2015   (JP) ................................ 2015-059201

(51) Int. Cl.
| | |
|---|---|
| *H01M 10/615* | (2014.01) |
| *H01M 2/10* | (2006.01) |
| *H01M 10/625* | (2014.01) |
| *H01M 10/657* | (2014.01) |
| *H01M 10/6555* | (2014.01) |

(Continued)

(52) U.S. Cl.
CPC ........... *H01M 10/615* (2015.04); *B60L 50/64* (2019.02); *B60L 50/66* (2019.02); *B60L 58/27* (2019.02); *H01M 2/1077* (2013.01); *H01M 10/613* (2015.04); *H01M 10/625* (2015.04); *H01M 10/657* (2015.04); *H01M 10/6554* (2015.04); *H01M 10/6555* (2015.04); *H01M 10/6561* (2015.04); *H01M 10/6562* (2015.04); *H01M 10/663* (2015.04); *B60L 2240/545* (2013.01); *H01M 10/643* (2015.04); *H01M 2220/20* (2013.01); *Y02T 10/705* (2013.01); *Y02T 10/7005* (2013.01)

(58) Field of Classification Search
CPC ............. H01M 10/615; H01M 10/613; H01M 10/625; H01M 10/6554; H01M 10/6555; H01M 10/6561; H01M 10/6562; H01M 10/657; H01M 10/663; H01M 10/643; H01M 2/1077
See application file for complete search history.

(56) References Cited

U.S. PATENT DOCUMENTS

| | | |
|---|---|---|
| 2003/0162084 A1 | 8/2003 | Shigeta et al. |
| 2006/0068278 A1 | 3/2006 | Bloom et al. |

(Continued)

FOREIGN PATENT DOCUMENTS

| | | |
|---|---|---|
| CN | 1235311 C | 1/2006 |
| EP | 1 333 521 A2 | 8/2003 |

(Continued)

OTHER PUBLICATIONS

Communication dated Jul. 27, 2016 from the European Patent Office in counterpart European application No. 16161391.4.

*Primary Examiner* — Jimmy Vo
(74) *Attorney, Agent, or Firm* — Sughrue Mion, PLLC

(57) ABSTRACT

A battery pack including a battery module and a heater is provided. The battery module includes a plurality of cylindrical batteries, a thermal diffusing plate, a first chamber, and a second chamber. The thermal diffusing plate houses and holds the plurality of cylindrical batteries. The first chamber is configured to distribute cooling air to cool each of the plurality of cylindrical batteries. The second chamber is formed at least in part by the thermal diffusing plate. The heater is configured such that convection occurs in the second chamber.

20 Claims, 8 Drawing Sheets

(51) Int. Cl.
*H01M 10/6561* (2014.01)
*H01M 10/613* (2014.01)
*H01M 10/6554* (2014.01)
*H01M 10/6562* (2014.01)
*H01M 10/663* (2014.01)
*B60L 58/27* (2019.01)
*B60L 50/60* (2019.01)
*B60L 50/64* (2019.01)
*H01M 10/643* (2014.01)

(56) References Cited

U.S. PATENT DOCUMENTS

| | | |
|---|---|---|
| 2008/0096072 A1 | 4/2008 | Fukusako et al. |
| 2008/0198897 A1 | 8/2008 | Suzuki et al. |
| 2012/0021260 A1 | 1/2012 | Yasui et al. |
| 2012/0242291 A1 | 9/2012 | Kimura |
| 2013/0017422 A1 | 1/2013 | Bae et al. |
| 2013/0344370 A1 | 12/2013 | Kinoshita et al. |
| 2015/0042284 A1 | 2/2015 | Murata |
| 2016/0285139 A1 | 9/2016 | Kimura |
| 2016/0285142 A1 | 9/2016 | Kimura |

FOREIGN PATENT DOCUMENTS

| | | |
|---|---|---|
| EP | 1 705 743 A1 | 9/2006 |
| JP | 2003-223938 A | 8/2003 |
| JP | 2008-053149 A | 3/2008 |
| JP | 2008-204708 A | 9/2008 |
| JP | 2012-243535 A | 12/2012 |
| JP | 5392407 B2 | 1/2014 |
| JP | 2016-178066 A | 10/2016 |
| JP | 2016-178069 A | 10/2016 |
| KR | 10-2011-0118807 A | 11/2011 |
| WO | 2012/124446 A1 | 9/2012 |
| WO | 2012124556 A1 | 9/2012 |
| WO | 2013/042165 A1 | 3/2013 |

BATTERY PACK AND HEATER ASSEMBLY

CROSS-REFERENCE TO RELATED APPLICATIONS

This application claims priority from Japanese Patent Application No. 2015-059201, filed in the Japanese Patent Office on Mar. 23, 2015, the disclosure of which, including the specification, drawings and abstract, is incorporated herein by reference in its entirety.

BACKGROUND

1. Field

The disclosure relates to a structure of a battery pack including a battery module containing a plurality of cylindrical batteries.

2. Description of Related Art

Battery packs configured by housing battery sets including a number of batteries connected in series or in parallel in casings are used in electric-motor vehicles or the like. Such battery packs cause problems, such as decrease in output thereof and decrease in recharging capacity, if the temperature thereof becomes lower. To cope with this, there has been a proposal to provide a battery pack with a heater so as to heat each battery by this heater if the temperature thereof is low.

For example, Japanese Patent No. 5392407 discloses a technique regarding a battery back including: a plurality of cylindrical batteries; and a metallic battery holder that holds the plurality of cylindrical batteries, wherein a heater is directly disposed to a side surface of the battery holder so as to heat the cylindrical batteries through the battery holder.

Japanese Patent Application Publication No. 2012-243535 discloses a technique regarding a battery pack including: a plurality of cylindrical batteries; and a battery holder partitioned into separated battery housing spaces in each of which each cylindrical battery can be housed, wherein a heating element is disposed with a heating surface thereof in contact with part of an outer circumferential surface of each cylindrical battery so as to directly heat the part of each cylindrical battery by the heating element.

Japanese Patent Application Publication No. 2008-053149 discloses a battery pack including: stacked batteries formed by stacking a plurality of square batteries; a casing that houses the stacked batteries, and has a separator providing separation from the stacked batteries; and a heater disposed adjacent to an outer surface of the separator, wherein the battery pack is configured to heat each square battery through air present between the separator and the batteries.

In a battery set including a plurality of batteries connected in series or in parallel, a difference in temperature among the batteries might cause non uniform charge-discharge behavior among the batteries. Therefore, particular batteries experience significant decrease in residual capacity, which might cause progress of deterioration to the particular batteries. Hence, it is important in a battery set configured by the plurality of batteries to maintain a uniform temperature among the batteries.

Unfortunately, as in the case of the technique described in JP 5392407 B, if the heater is directly disposed to the battery holder, the portion of the battery holder in contact with the heater is locally heated, thus causing a difference in temperature among the batteries heated through the battery holder, which results in variation in temperature among the heated batteries. As in the case of the technique described in JP 2012-243535 A, in a method of bringing a heating surface of each heating element to be in contact with part of the outer circumference of each cylindrical battery, there occurs difference in temperature between part of each battery in contact with the heating surface and part of this battery out of contact with the heating surface, thus causing difference in inner temperature of the same battery, which might result in variation in temperature among the heated batteries. In addition, in the technique described in JP 2008-053149 A, since a gap cannot be provided below each mounting portion that supports the stacked batteries in the casing, this mounting portion cannot be heated by the heater, which might cause variation in temperature among the heated stacked batteries. As aforementioned, in the techniques described in JP 5392407 B, JP 2012-243535 A, and JP 2008-053149 A, the temperatures of the heated batteries in the battery packs may vary.

SUMMARY

A configuration of suppressing variation in temperature among heated batteries in a battery pack is provided.

According to an embodiment of the disclosure, a battery pack is provided. The battery pack may include a battery module and a heater. A battery module may include a plurality of cylindrical batteries, a thermal diffusing plate, a first chamber, and a second chamber. The thermal diffusing plate may house and hold the plurality of cylindrical batteries. The cooling air to cool each of the plurality of cylindrical batteries may be introduced into the first chamber. The second chamber may include walls, and the walls may include a first part and a second part. At least the first part of the walls may include the thermal diffusing plate. The heater may be disposed with a predetermined distance from the thermal diffusing plate. The heater may be configured such that convection occurs in the second chamber.

According to an embodiment of the disclosure, the second chamber may include an air space. The heater may be disposed on an opposite side of the air space from the thermal diffusing plate, and be configured such that the air convection occurs in the air space.

Through this configuration, in the embodiment, the heater heats the air in the vicinity of the thermal diffusing plate, and the thermal diffusing plate and the plurality of cylindrical batteries held by the thermal diffusing plate are heated by the convection of the heated air. Therefore, it is possible to prevent the thermal diffusing plate and the cylindrical batteries from being locally heated. Further, it is possible to suppress variation in temperature among the heated cylindrical batteries in the battery pack.

According to an embodiment of the disclosure, the second part of the walls of the second chamber may include a bottom cover. The bottom cover may have a high heat transfer property, and the bottom cover may be assembled with a predetermined distance from the thermal diffusing plate. The heater may be disposed adjacent to the bottom cover.

According to an embodiment of the disclosure, the second part of the walls of the second chamber may include a bottom cover. The bottom cover may have a high heat transfer property, and be disposed on an opposite side of the air space from the thermal diffusing plate. The heater may be assembled to the bottom cover.

In this configuration, the bottom cover having a high heat transfer property is heated by the heater, thereby suppressing variation in temperature of the heated air space of the second chamber partitioned by the bottom cover and the thermal diffusing plate, and also suppressing variation in temperature among the heated cylindrical batteries in the battery pack.

According to an embodiment of the disclosure, the second chamber may be a smoke exhaust passage to discharge gas released from the cylindrical batteries.

Through this configuration, it is possible to effectively use the inner space of the battery pack, thus configuring the battery pack to be compact.

According to an embodiment of the disclosure, the battery module may be configured such that the second chamber is located vertically below the first chamber. The heater may be located vertically below the thermal diffusing plate.

This configuration heats the air space of the second chamber from vertically below, and thus the heated air is collected in the vicinity of the thermal diffusing plate located above the second chamber, thereby suppressing variation in temperature among the heated cylindrical batteries in the battery pack.

The disclosure promotes an effect to suppress variation in temperature among the heated batteries in the battery pack.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
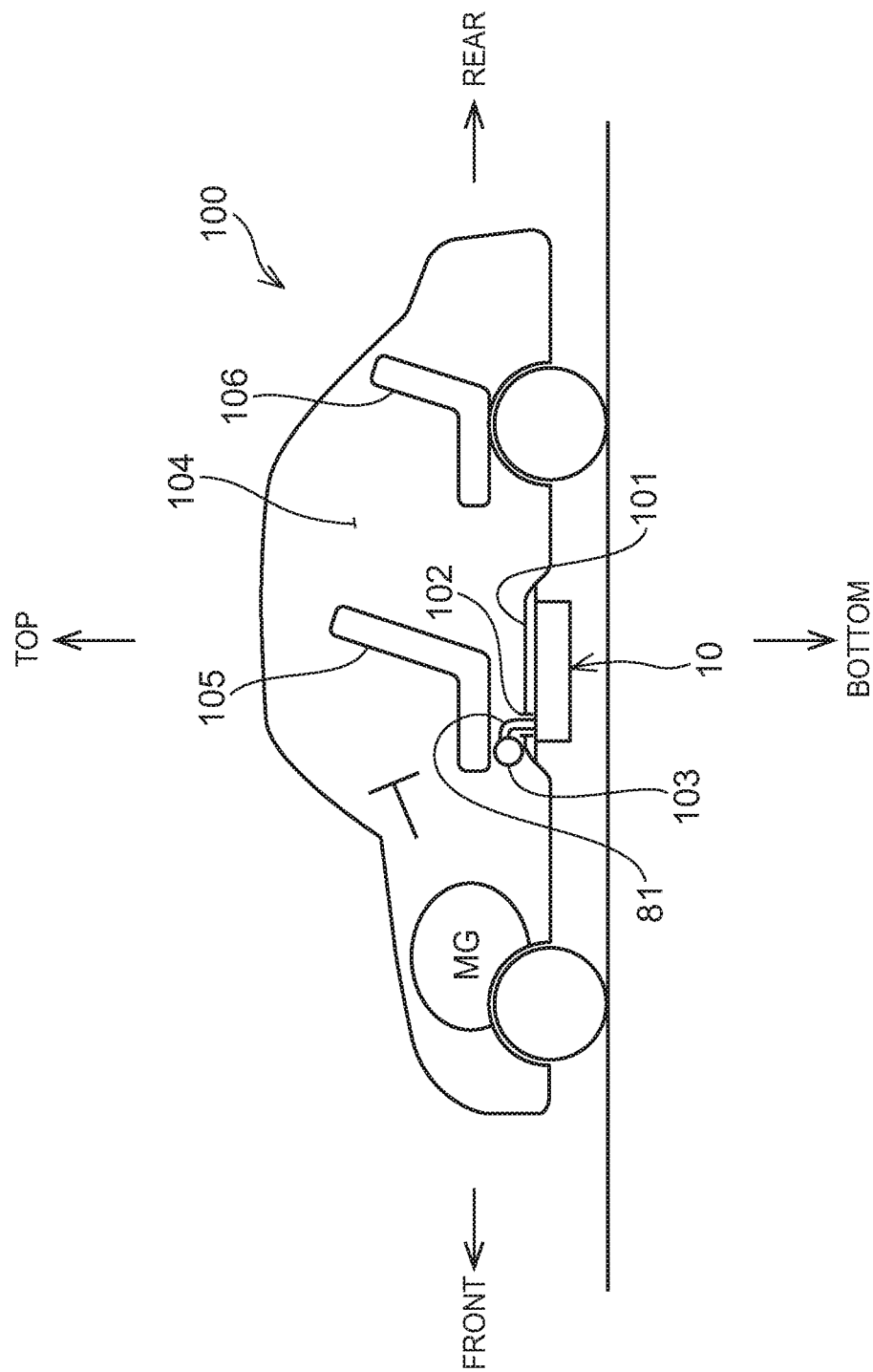
FIG. 1 is an explanatory view showing a state in which a battery pack is installed in an electric-motor vehicle.
Figure 2:
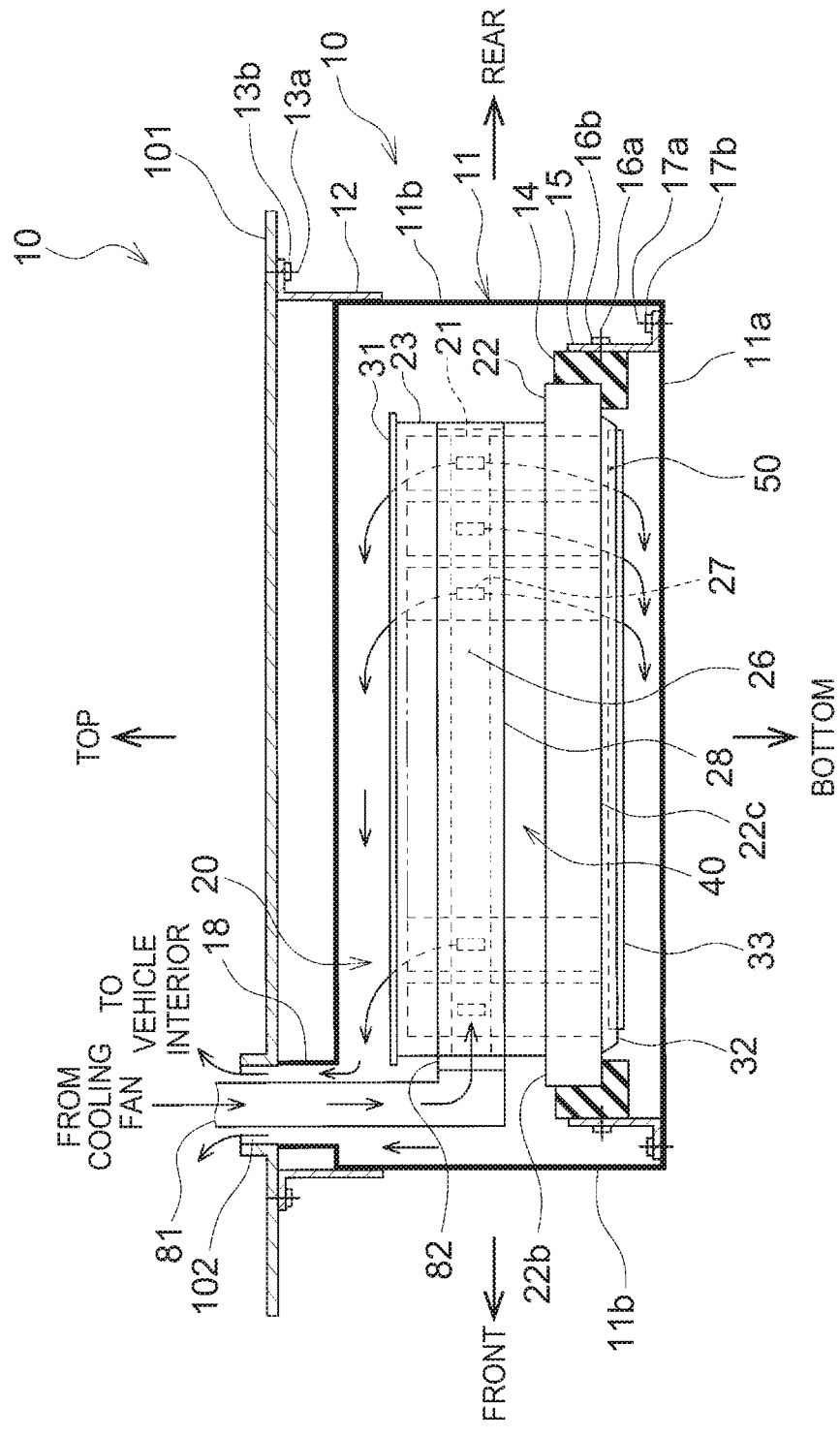
FIG. 2 is an elevation view of the battery pack.

Hereinafter, a first embodiment of the disclosure will be described with reference to drawings. In the following first embodiment, a battery pack of an electric-motor vehicle 100 driven by a motor generator will be explained. The battery pack 10 is disposed adjacent to a bottom surface of a floor panel 101 in the vicinity of a front seat 105, as shown in FIG. 1. More specifically, as shown in FIG. 2, a casing 11 is fixed to a bottom surface of the floor panel 101 of the electric-motor vehicle 100 with brackets 12 attached to side plates 11b, bolts 13a, and nuts 13b. This means that the casing 11 is hung from the floor panel 101. Cooling air to cool batteries housed in the battery pack 10 is supplied by a cooling fan 103 disposed inside a vehicle interior 104. In FIG. 1, "TOP" denotes a vertically upward direction. Similarly, in FIG. 1, "BOTTOM" denotes a vertically downward direction, "FRONT" denotes a frontward direction of the electric-motor vehicle 100, and "REAR" denotes a rearward direction of the electric-motor vehicle 100.

As shown in FIG. 2, the battery pack 10 of the first embodiment includes a battery module 20 and a bar heater 33 in the casing 11. The battery module 20 includes a plurality of cylindrical batteries 21, a thermal diffusing plate 22, a cover 23, a ceiling cover 31, and a bottom cover 32. The thermal diffusing plate 22 holds the cylindrical batteries 21. The cover 23 is made of resin, and covers an outer circumference of a set of the cylindrical batteries held by the thermal diffusing plate 22. The ceiling cover 31 is disposed onto an upper portion of the cover 23, and the bottom cover 32 is disposed below the thermal diffusing plate 22. The bottom cover 32 is formed in a tray shape. The cylindrical batteries 21 are chargeable and dischargeable secondary batteries, such as nickel-metal hydride batteries and lithium-ion batteries housed in cylindrical cases, for example.

An L-shaped insulator 14 formed of resin is disposed at each lower corner of each longitudinal end of the thermal diffusing plate 22. One surface of each L-shaped bracket 15 is fixed to an end surface of each insulator 14 with a bolt 16a and a nut 16b. The other surface of each bracket 15 is fixed to an inner surface of a bottom plate 11a of the casing 11 with a bolt 17a and a nut 17b. In this manner, the thermal diffusing plate 22 holding the cylindrical batteries 21 is fixed to the inner surface of the bottom plate 11a of the casing 11.

As shown in FIG. 2, an air flow passage 26 is formed in the battery module 20. A cooling air duct 81 is connected to an open end of the air flow passage 26 via a connecting duct 82. The cooling air duct 81 is configured to introduce cooling air sent from a cooling fan 103 as shown in FIG. 1 into the air flow passage 26. As shown in FIG. 2, the cooling air duct 81 is introduced from a through-portion 102 formed in the floor panel 101 through an inlet nozzle 18 disposed adjacent to an upper part of the casing 11 into the casing 11.

Figure 3:
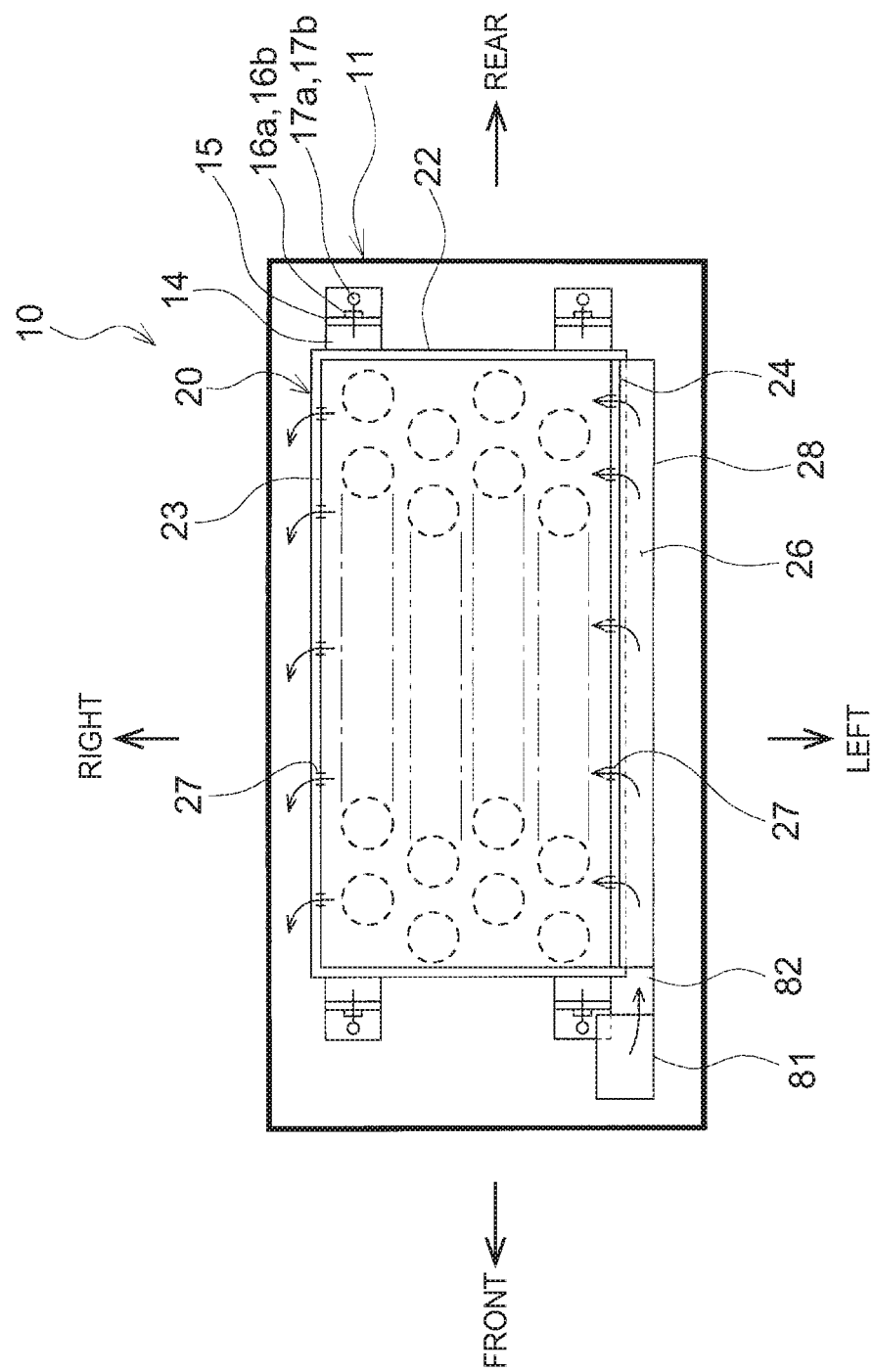
FIG. 3 is a plan view of the battery pack.

As shown in FIG. 2 and FIG. 3, the cooling air sent from the cooling fan 103 flows through the cooling air duct 81 and the connecting duct 82 into the air flow passage 26. The air flow passage is formed to a left side surface of the battery module 20. The other end portion of the air flow passage 26 is closed, and thus the cooling air having flown in the air flow passage 26 flows from slits 27 provided in the left side surface of the cover 23 into an inside of the cover 23 as shown in FIG. 3. The cooling air cools each of the cylindrical batteries 21 housed inside the cover 23. The cooling air of which temperature becomes higher after cooling the cylindrical batteries 21 is exhausted from the slit 27 provided in a right side surface of the cover 23 to an outside of the battery module 20. As shown in FIG. 2, the air to be exhausted flows through a space between the battery module 20 and the casing 11. The air to be exhausted flows through a gap between the inlet nozzle 18 of the casing 11 as well as the through-portion 102 of the floor panel 101 and the cooling air duct 81, and is returned into the vehicle interior 104.

Hereinafter, with reference to FIG. 4 and FIG. 5, the configuration of the battery module 20 housed in the casing 11 will be described. As shown in FIG. 5, the thermal diffusing plate 22 is a metallic plate provided with a number of through-holes 22a into which the cylindrical batteries 21 are inserted. The thermal diffusing plate 22 is made of metal such as aluminum, for example. The cylindrical batteries 21 are inserted into the through-holes 22a of the thermal diffusing plate 22. The cylindrical batteries 21 are then fixed to the through-holes 22a by filling a gap between inner surfaces (cylindrical surfaces) of the through-holes 22a and outer surfaces (cylindrical surfaces) of the cylindrical batteries 21 with an adhesive agent. The cylindrical batteries 21 are assembled into the through-holes 22a of the thermal diffusing plate 22, thereby transferring heat from the outer surfaces (cylindrical surfaces) of the cylindrical batteries 21 having a higher temperature to the thermal diffusing plate 22 by thermal conductivity so as to decrease the temperature of the cylindrical batteries 21 having a higher temperature. Furthermore, heat of the thermal diffusing plate 22 is transferred to the cylindrical batteries 21 having a lower temperature by thermal conductivity so as to increase the temperature of the cylindrical batteries 21 having a lower temperature. The respective cylindrical batteries 21 are held by the corresponding through-holes 22a so that heat transfer can be achieved between the cylindrical surfaces of the cylindrical batteries 21 and the thermal diffusing plate 22, thereby suppressing variation in temperature among the cylindrical batteries 21. The thermal diffusing plate 22 is formed by a metallic material having a high thermal conductivity, such as aluminum, so as to promote an efficient heat transfer among the cylindrical batteries 21. The thermal diffusing plate 22 has a thickness sufficient for holding the cylindrical batteries 21 by the cylindrical surfaces of the through-holes 22a, and achieving an effective heat transfer by thermal conductivity, specifically, approximately 10 to 20 mm, or an approximately ¼ thickness of a length of each cylindrical battery 21, for example.

Figure 4:
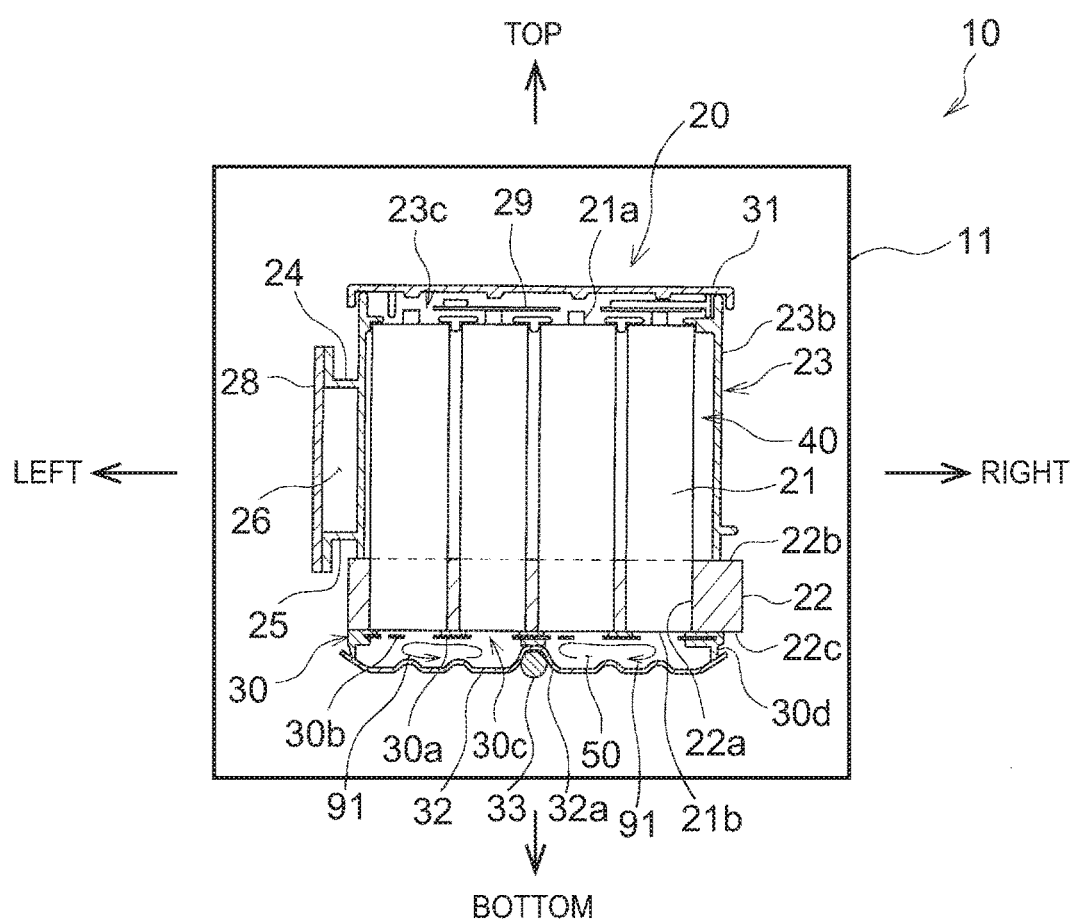
FIG. 4 is a cross sectional view of the battery pack.
Figure 5:
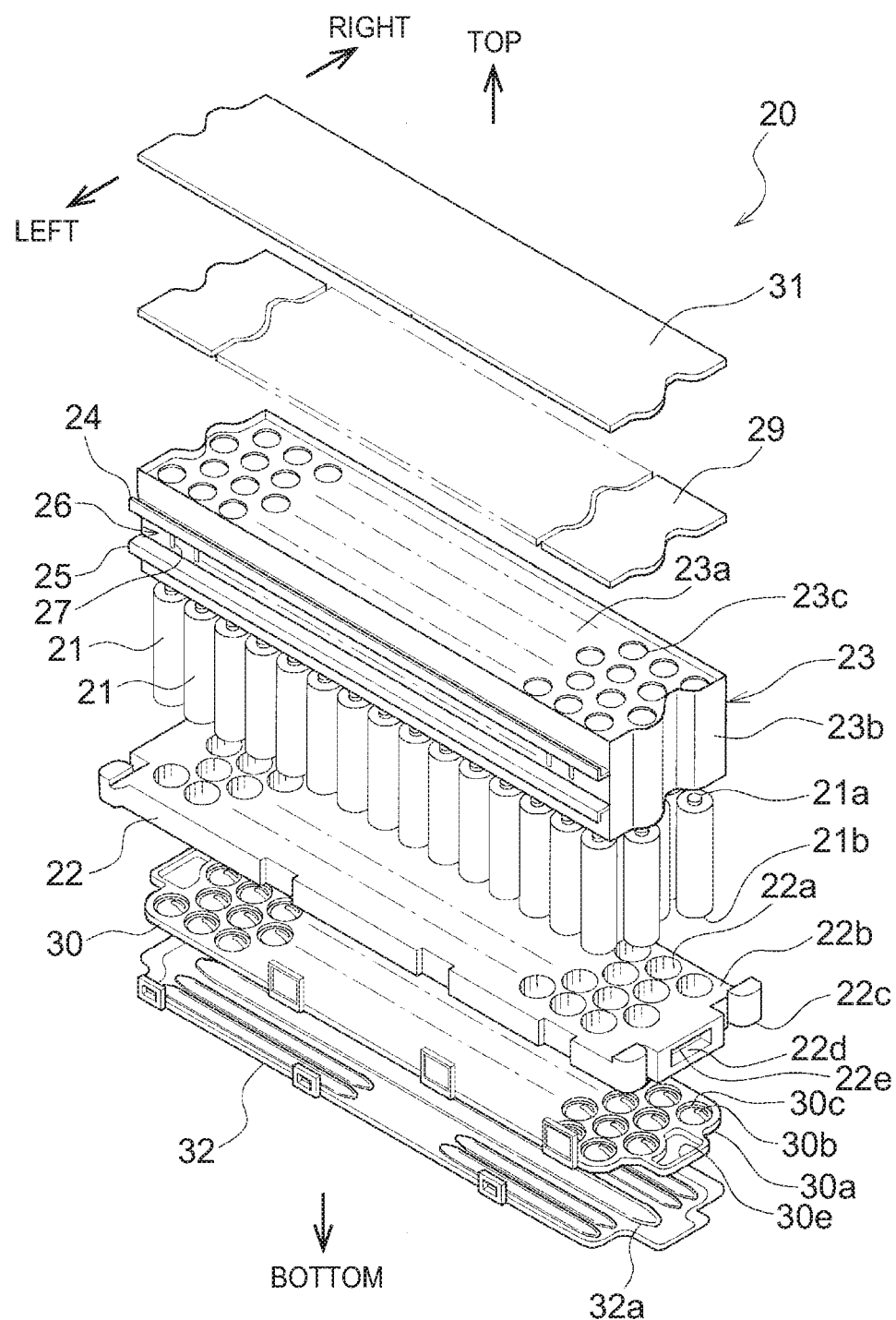
FIG. 5 is an exploded perspective view of a battery module housed in the battery pack.

As shown in FIG. 4, the resin cover 23 is disposed above the thermal diffusing plate 22. The cover 23 includes a ceiling plate 23a and a rectangular cylinder 23b. Holes 23c are formed in the ceiling plate 23a so that respective positive electrodes 21a of the cylindrical batteries 21 project from these holes 23c. The rectangular cylinder 23b covers the outer circumference of the plurality of cylindrical batteries 21 that are assembled to the thermal diffusing plate 22. As shown in FIG. 4 and FIG. 5, a plurality of positive-electrode bus bars 29 are disposed onto the holes 23c of the cover 23 in such a manner that each of the positive-electrode bus bars 29 connects the positive electrodes 21a of the cylindrical batteries 21 for each of several groups. The resin ceiling cover 31 is disposed onto the positive-electrode bus bars 29.

As shown in FIG. 4 and FIG. 5, an upper flange 24 and a lower flange 25 are formed on a side surface of the cover 23 in a manner as to protrude outward. Each of the upper flange 24 and the lower flange 25 is formed in an L-shape. The upper flange 24 includes a flange surface extending upward. The lower flange 25 includes a flange surface extending downward. As shown in FIG. 4, a cover plate 28 is disposed adjacent to the respective flange surfaces of the upper flange 24 and the lower flange 25. The rectangular air flow passage 26 is formed by the upper and lower flanges 24, 25 and the cover plate 28. As shown in FIG. 2 and FIG. 5, a longitudinal side surface of the cover 23 that forms the air flow passage 26 is provided with the slits 27 that introduce the cooling air for the cylindrical batteries 21. FIG. 2 and FIG. 5 illustrate the slits 27 formed in the left side surface of the cover 23. However, the same slits 27 as those in the left side surface are also formed in the right side surface of the cover 23, as shown in FIG. 3. As aforementioned, the slits 27 formed in the right side surface of the cover 23 are used for exhausting the air after cooling the cylindrical batteries 21 from the inside of the cover 23.

With the above configuration, the upper surface 22b of the thermal diffusing plate 22, the cover 23, and the ceiling cover 31 house the cylindrical batteries 21 thereinside. The thermal diffusing plate 22, the cylindrical batteries 21, the cover 23, and the ceiling cover 31 constitute a first chamber 40 that is a space into which the cooling air to cool the cylindrical batteries 21 is introduced. The upper surface 22b of the thermal diffusing plate 22 is part of the walls partitioning the first chamber 40.

As shown in FIG. 4 and FIG. 5, a negative-electrode bus bar assembly 30 that connects the negative electrodes 21b of the cylindrical batteries 21 for each of several groups is disposed on a bottom side of the lower surface 22c of the thermal diffusing plate 22. As shown in FIG. 5, the negative-electrode bus bar assembly 30 is configured by arranging and resin-molding a plurality negative-electrode bus bars 30a. Each negative-electrode bus bar 30a is configured by forming respective holes 30c corresponding to the arrangement of the cylindrical batteries 21 in a plate having the same shape as that of the positive-electrode bus bar 29. A plate terminal 30b to be in contact with the negative electrode 21b of each cylindrical battery 21 is disposed adjacent to each hole 30c of each negative-electrode bus bar 30a.

Each positive-electrode bus bar 29 connects the positive electrodes 21a of the cylindrical batteries 21 in each same group. Each negative-electrode bus bar 30a connects the negative electrodes 21b of the cylindrical batteries 21 in each same group. The cylindrical batteries 21 in a group connected by the respective positive-electrode bus bars 29 and negative-electrode bus bars 30a are connected to one another in parallel. The respective groups of the plurality of cylindrical batteries 21 connected in parallel are then connected in series. The series connection of the respective groups is carried out by connecting the respective positive-electrode bus bars 29 and the respective negative-electrode bus bars 30a by a connecting bus bar (not shown). The battery set is configured in this manner.

As shown in FIG. 4 and FIG. 5, the bottom cover 32 is disposed adjacent to a bottom side of the negative-electrode bus bar assembly 30. A central portion of the bottom cover 32 is recessed in a tray-shape, and a bottom surface thereof includes a reinforcing recessed-protruding portion 32a. As shown in FIG. 4, a resin rib 30d protrudes from an outer circumference of the bottom surface of the negative-electrode bus bar assembly 30. The bottom cover 32 is disposed such that an outer circumference of the bottom cover 32 comes into contact with a front end of the rib 30d. The bottom cover 32 is formed by metal having a high heat transfer property, such as aluminum.

The thermal diffusing plate 22, the cylindrical batteries 21, the negative-electrode bus bar assembly 30, and the bottom cover 32 are configured in this manner. The lower surface 22c of the thermal diffusing plate 22, the negative electrodes 21b of the cylindrical batteries 21, the rib 30d of the negative-electrode bus bar assembly 30, and the bottom cover 32 form a second chamber 50 that is a single room including an air space inside of the second chamber 50. The lower surface 22c of the thermal diffusing plate 22 is part of walls that partition the second chamber 50.

As shown in FIG. 5, an opening 30e in a substantially rectangular shape is provided at each longitudinal end of the negative-electrode bus bar assembly 30. An opening 22e is provided at each longitudinal end of the lower surface 22c of the thermal diffusing plate 22. An opening 22d is also provided in each longitudinal end surface of the thermal diffusing plate 22. The opening 22d in each longitudinal end surface and each corresponding opening 22e of the lower surface 22c of the thermal diffusing plate 22 are configured to communicate with each other through a flow passage bent in an L-shape. If the negative-electrode bus bar assembly 30 is attached to the lower surface 22c of the thermal diffusing plate 22, each opening 30e of the negative-electrode bus bar assembly 30 is overlaid with each corresponding opening 22e of the lower surface 22c of the thermal diffusing plate 22. Accordingly, the negative-electrode bus bar assembly 30 and the bottom cover 32 are attached to the thermal diffusing plate 22, thereby forming a flow passage that allows the second chamber 50 to communicate with the opening 22d in each end surface of the thermal diffusing plate 22.

The negative electrode 21b of each cylindrical battery 21 has a structure to open an end surface thereof by inner pressure. Through this configuration, if gas is generated inside the cylindrical battery 21, it is possible to release the gas to the outside. The gas released from the negative electrode 21b of the cylindrical battery 21 flows into the second chamber 50 formed below the thermal diffusing plate 22. The gas having flown into the second chamber 50 flows through the second chamber 50 to the both longitudinal ends of the battery module 20. The gas flows through the opening 30e of the negative-electrode bus bar assembly 30, the opening 22e and the opening 22d of the thermal diffusing plate 22, and is then exhausted to the outside. In this manner, the second chamber 50 serves as part of a smoke exhaust passage to exhaust the gas if the gas is released from the cylindrical batteries 21.

As shown in FIG. 4, the bottom cover 32 includes the recessed-protruding portion 32a that is inwardly recessed at the central portion in the width direction of the bottom cover 32. A bar heater 33 to heat the battery module 20 is disposed adjacent to an outer surface of this recessed-protruding portion 32a. Heat emitted from the bar heater 33 heats the bottom cover 32 from an outer surface of the bottom cover 32. Because the bottom cover 32 is made of a material excellent in heat transfer property, such as metal or the like, the temperature of the entire bottom cover 32 becomes increased by the heat of the bar heater 33. The bottom cover 32 of which temperature is increased heats the air in the second chamber 50 between the bottom cover 32 and the lower surface 22c of the thermal diffusing plate 22 from vertically below. Hence, the air inside the second chamber 50 is heated while moving as indicated by arrows 91 of FIG. 4 by convection. The heated air comes into contact with the lower surface 22c of the thermal diffusing plate 22 and also with the surfaces of the respective negative electrodes 21b of the cylindrical batteries 21 so as to heat these surfaces. Specifically, the heated air heats the lower surface 22c of the thermal diffusing plate 22 and the respective surfaces of the negative electrodes 21b of the cylindrical batteries 21. The temperature of the air in contact with the negative electrodes 21b of the respective cylindrical batteries 21 is substantially uniform, and thus heat input from the air into the respective cylindrical batteries 21 becomes substantially uniform. Accordingly, variation in temperature among the respective heated cylindrical batteries 21 is unlikely to be caused. As aforementioned, the thermal diffusing plate 22 is made of metal having a high thermal conductivity, such as aluminum; therefore, the heat inputted into the lower surface 22c of the thermal diffusing plate 22 transfers from the surface of each through-hole 22a of the thermal diffusing plate 22 to the cylindrical surface of each cylindrical battery 21. Each cylindrical battery 21 is heated from the cylindrical surface thereof. The thermal diffusing plate 22 can efficiently promote the heat transfer among the cylindrical batteries 21, thus suppressing variation in temperature among the heated cylindrical batteries 21.

In this manner, in the battery pack 10 of the first embodiment, the bar heater 33 disposed adjacent to the center of the bottom cover 32 circulates the air between the bottom cover 32 and the thermal diffusing plate 22 by convection, thereby heating the bottom cover 32 and the negative electrodes 21b of the cylindrical batteries 21. Specifically, in the battery pack of the first embodiment, it is possible to suppress variation in temperature among the heated cylindrical batteries 21 by using the small bar heater 33. Through this configuration, it is possible to configure the battery pack 10 to be compact.

The battery pack 10 of the first embodiment includes the second chamber 50 serving as the smoke exhaust passage to exhaust the gas if the gas is released from the cylindrical batteries 21. The bar heater 33 is configured to heat each cylindrical battery 21 through the air space in the second chamber 50. Hence, it is unnecessary to provide a dedicated air space between the bar heater 33 and the cylindrical batteries 21, or between the bar heater 33 and the thermal diffusing plate 22. Through this configuration, it is possible to configure the battery pack 10 to be compact.

Next, with reference to FIG. 6, a second embodiment of the disclosure will be described. The same reference numerals are used for components that are the same as those of the aforementioned first embodiment, and description thereof will be omitted. In the second embodiment as shown in FIG. 6, a tabular sheet heater 34 is used instead of using the bar heater 33 of the first embodiment.

Figure 6:
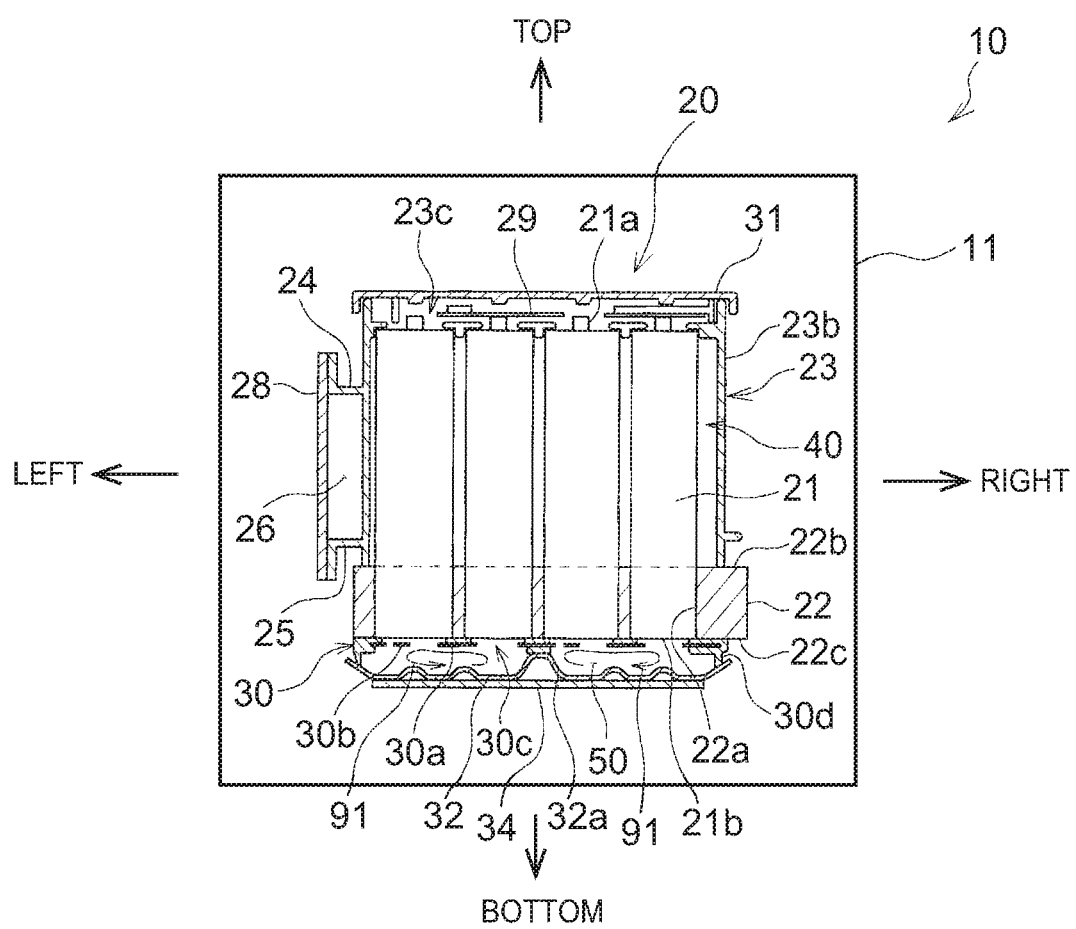
FIG. 6 is a cross sectional view of a battery pack using a tabular heater according to another embodiment of the disclosure.

As shown in FIG. 6, in the battery pack 10 of the second embodiment, the sheet heater 34 is disposed adjacent to an outer surface on a bottom side of the bottom cover 32. The sheet heater 34 can heat a wide range of the surface on the bottom side of the bottom cover 32. Hence, it is possible to reduce variation in temperature of the heated bottom cover 32 in the second embodiment to be smaller than variation in temperature of the heated bottom cover 32 in the first embodiment. Accordingly, it is possible to reduce local variation in temperature in the air space between the thermal diffusing plate 22 and the bottom cover 32 in the second embodiment to be smaller than the variation in temperature in the air space between the thermal diffusing plate 22 and the bottom cover 32 in the first embodiment. Consequently, it is possible to reduce variation in temperature among the heated cylindrical batteries 21 of the battery module 20 in the second embodiment to be smaller than variation in temperature among the heated cylindrical batteries 21 in the first embodiment.

Figure 7:
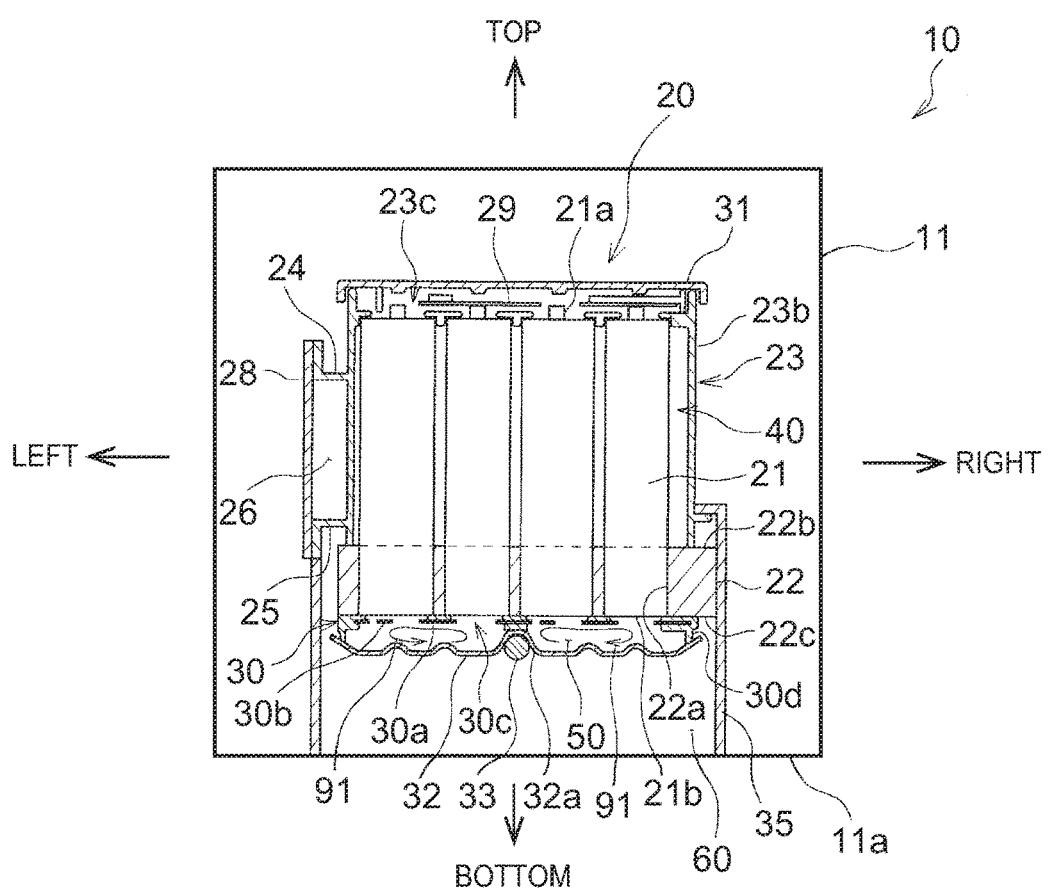
FIG. 7 is a cross sectional view of a battery pack according to another embodiment of the disclosure providing a skirt so as to form a space between a lower portion of a battery module and a casing.

Next, with reference to FIG. 7, a third embodiment of the disclosure will be explained. The same reference numerals are used for components that are the same as those of the aforementioned first embodiment, and description thereof will be omitted. In the third embodiment as shown in FIG. 7, an annular skirt 35 in a rectangular shape is provided in a manner as to form a third chamber 60 that is a substantially closed space in a room between the bottom cover 32 and the bottom plate 11a of the casing 11 of the first embodiment. As shown in FIG. 7, a left upper end of the skirt 35 is connected to the lower flange 25 of the cover 23. A right upper end of the skirt 35 is connected to a rib of the right side surface of the cover 23. Each lower end of the skirt 35 is connected to the bottom plate 11a of the casing 11. A plate that connects the cover 23 or the thermal diffusing plate 22 to the bottom plate 11a of the casing 11 is also disposed adjacent to each longitudinal end of the battery module 20. The respective plates of the skirt 35 are so connected to one another as to form a rectangular annular shape. More specifically, the left and right lower plates of the battery module 20, and the lower plates at the both longitudinal ends of the battery module 20 are connected into a rectangular annular shape.

The third chamber 60 surrounded by the skirt 35, the bottom cover 32, and the bottom plate 11a of the casing 11 is formed into a substantially closed space. Hence, it is possible to suppress release of the heat of the bar heater 33 from the bottom of the bottom cover 32 to the other portions of the casing 11. It is also possible to suppress variation in temperature of the heated bottom cover 32 by circulating the air in the third chamber 60 by convection with the heat of the bar heater 33. Accordingly, the battery pack 10 of the present embodiment can save energy for heating the respective cylindrical batteries 21. In the third embodiment, it is possible to reduce variation in temperature among the heated cylindrical batteries 21 of the battery module 20 to be smaller than variation in temperature among the respective heated cylindrical batteries 21 of the first and the second embodiments.

Figure 8:
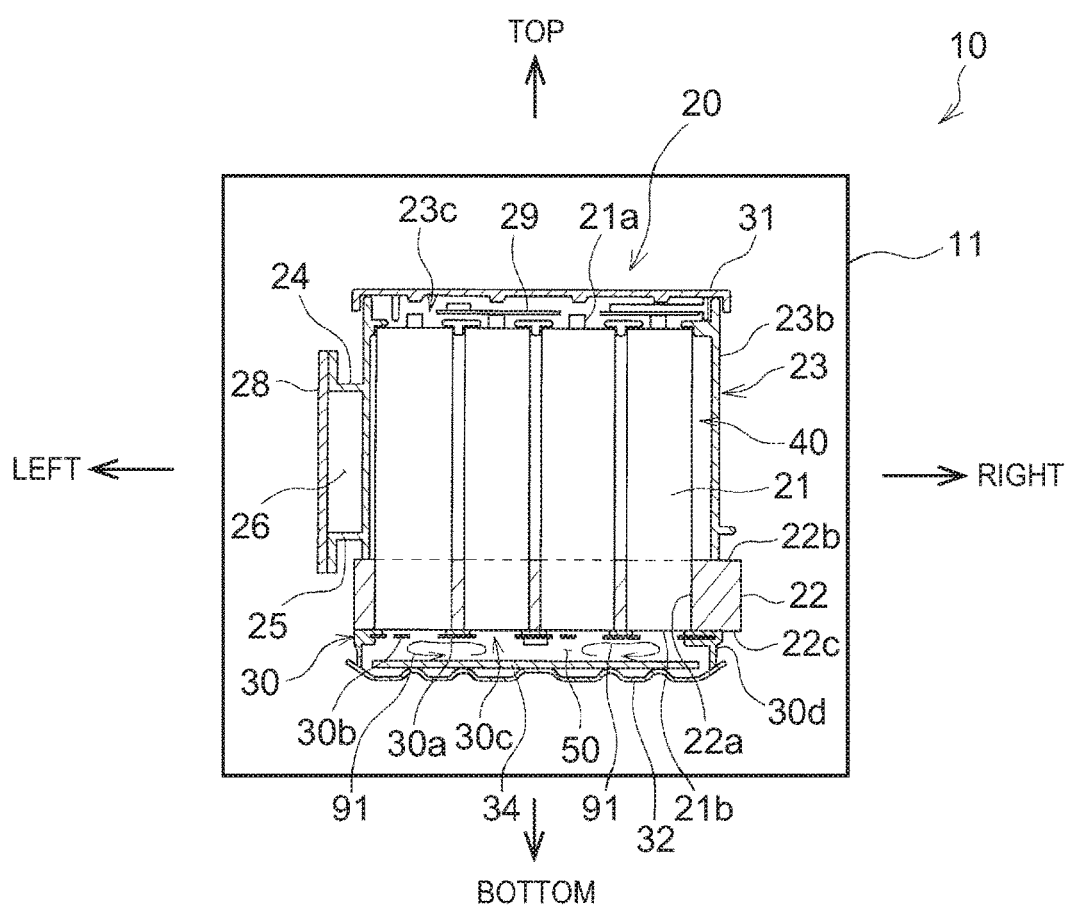
FIG. 8 is a cross sectional view of a battery pack according to another embodiment of the disclosure providing a heater inward from a bottom cover.

Next, with reference to FIG. 8, a fourth embodiment of the disclosure will be explained. The same reference numerals are used for components that are the same as those of the aforementioned first embodiment, and description thereof will be omitted. In the fourth embodiment as shown in FIG. 8, the sheet heater 34 of the second embodiment is disposed in the second chamber 50 between the thermal diffusing plate 22 and the bottom cover 32. The sheet heater 34 is disposed with a predetermined distance from the lower surface 22c of the thermal diffusing plate 22 and the negative electrodes 21b of the cylindrical batteries 21. The sheet heater 34 circulates the air in the second chamber 50 by convection as indicated by the arrows 91. With this convection, the thermal diffusing plate 22 and the negative electrodes 21b of the cylindrical batteries 21 are heated. In the fourth embodiment, the sheet heater 34 has a dimension sufficient for covering a range of the negative electrodes 21b of the cylindrical batteries 21. Through this configuration, in the fourth embodiment, variation in temperature among the heated cylindrical batteries 21 can be reduced to be smaller than variation in temperature among the cylindrical batteries 21 in each of the first embodiment, the second embodiment, and the third embodiment.

As aforementioned, each embodiment promotes an effect to suppress variation in temperature among the heated cylindrical batteries 21 in the battery pack 10.

In each of the aforementioned embodiments, it has been explained that the battery pack 10 is installed under the floor of the electric-motor vehicle 100, but the exemplary embodiments are not limited to the battery pack 10 installed in this manner. For example, the disclosure may also be applicable to the battery pack 10 installed in a space behind the rear seat 106 as shown in FIG. 1, or to the battery pack 10 installed in a luggage space. The disclosure may also be applicable to other electric-motor vehicles driven by engines and motors, such as hybrid vehicles.

The disclosure is not limited to the aforementioned embodiments, and includes all changes and modifications without departing from the technical scope and spirit of the disclosure specified by the claims.

What is claimed is:

1. A battery pack comprising:
   a battery module including a plurality of cylindrical batteries, the battery module comprising:
   a thermal diffusing plate housing and holding the plurality of cylindrical batteries;
   a first chamber configured to distribute cooling air to cool each of the plurality of cylindrical batteries; and
   a second chamber formed by walls, the walls including a first part and a second part, at least the first part of the walls including the thermal diffusing plate; and
   a heater configured such that convection occurs in the second chamber,
   wherein the second chamber is between the plurality of cylindrical batteries and the heater, and negative electrodes of the plurality of the cylindrical batteries partially define the first part of the walls that form the second chamber.

2. The battery pack according to claim 1, wherein:
   the second chamber comprises an air space,
   a lowermost surface of the thermal diffusing plate partially defines the first part of the walls that form the air space of the second chamber, and
   the heater is provided on a side of the air space opposite the thermal diffusing plate, the heater being configured such that air convection occurs in the air space.

3. The battery pack according to claim 1, wherein:
   the second part of the walls of the second chamber includes a bottom cover, the bottom cover being heat conductive, and the heater is disposed adjacent to the bottom cover.

4. The battery pack according to claim 2, wherein:
   the second part of the walls of the second chamber includes a bottom cover, the bottom cover being heat conductive and provided on the side of the air space opposite the thermal diffusing plate, and
   the heater is in contact with the bottom cover.

5. The battery pack according to claim 1, wherein the second chamber is a smoke exhaust passage configured to discharge gas released from the negative electrodes of the plurality of cylindrical batteries.

6. The battery pack according to claim 1, wherein:
   the battery module is configured such that the second chamber is located vertically below the first chamber, and
   the heater is located vertically below the thermal diffusing plate.

7. A heated battery pack assembly, comprising:
   a casing;
   a battery module located inside the casing, the battery module comprising: a plurality of batteries;
   a thermal diffusing plate in thermal communication with each of the plurality of batteries;
   a cover portion provided on a first side of the thermal diffusing plate that encloses the plurality of batteries in a first chamber; and
   a bottom cover provided on a second side of the thermal diffusing plate opposite the first side, so as to define a second chamber between the bottom cover and the thermal diffusing plate; and
   a heater in thermal contact with the bottom cover,
   wherein the thermal diffusing plate and the bottom cover comprise a heat conductive material, the second chamber is between the plurality of cylindrical batteries arid the heater, and negative electrodes of the plurality of the cylindrical batteries partially define the first part of the walls that form the second chamber.

8. The heated battery pack assembly of claim 7, further comprising an airflow passage configured to provide air from outside the casing to the first chamber.

9. The heated battery pack assembly of claim 8, wherein the battery module further comprises entry slits formed in a side surface thereof at an interface between the airflow passage and first chamber.

10. The heated battery pack assembly of claim 9, wherein the battery module further comprises exit slits formed in another side surface thereof.

11. The heated battery pack assembly of claim 10, wherein the battery module further comprises a pair of L-shaped flanges on an exterior surface thereof.

12. The heated battery pack assembly of claim 11, wherein the pair of L-shaped flanges are connected to a cover plate so as to define a flange channel bounded by the cover plate and the pair of L-shaped flanges.

13. The heated battery pack assembly of claim 12, wherein the flange channel is the airflow passage.

14. The heated battery pack assembly of claim 13, wherein the heater comprises a bar heater, and wherein the bar heater is provided in a recessed portion of the bottom cover on a side opposite the second chamber.

15. The heated battery pack assembly of claim 14, further comprising a skirt extending between the cover portion and the casing, so as to define a third chamber between the bottom cover and the casing, wherein the bar heater is in the third chamber.

16. The heated battery pack assembly of claim 13, wherein the heater comprises a sheet heater, and wherein the sheet heater contacts the bottom cover on a side opposite the second chamber.

17. The heated battery pack assembly of claim 13, wherein the heater comprises a sheet heater, and wherein the sheet heater is provided in the second chamber.

18. The heated battery pack assembly of claim 13, wherein the airflow passage is connected to a cooling air duct extending into an interior portion of a vehicle.

19. The heated battery pack assembly of claim 18, wherein the battery pack is secured to a bottom of at least one of a front seat area, a rear seat area, or a luggage area of the vehicle.

20. The heated battery pack assembly of claim 19, wherein the vehicle is one of an electric vehicle or a hybrid vehicle.

\* \* \* \* \*